No. 787,530. PATENTED APR. 18, 1905.
H. G. McCOMB.
CLUTCH FOR AUTOMOBILES.
APPLICATION FILED NOV. 8, 1904.

WITNESSES:
W. W. Canby.
M. M. Hamilton

INVENTOR
Henry G. McComb
BY
Harding & Harding
ATTORNEYS

No. 787,530. Patented April 18, 1905.

UNITED STATES PATENT OFFICE.

HENRY G. McCOMB, OF ARDMORE, PENNSYLVANIA, ASSIGNOR TO THE AUTOCAR COMPANY, OF ARDMORE, PENNSYLVANIA, A CORPORATION OF PENNSYLVANIA.

CLUTCH FOR AUTOMOBILES.

SPECIFICATION forming part of Letters Patent No. 787,530, dated April 18, 1905.

Application filed November 8, 1904. Serial No. 231,884.

*To all whom it may concern:*

Be it known that I, HENRY G. McCOMB, a citizen of the United States, residing at Ardmore, county of Montgomery, and State of Pennsylvania, have invented a new and useful Improvement in Clutches for Automobiles, of which the following is a full, clear, and exact description, reference being had to the accompanying drawings, which form a part of this specification.

The clutch of an automobile is now operated in one direction by means of a foot-lever in front of the operator to move the clutch out of operative connection and is held normally in and returned to operative connection by means of a spring. As now constructed in order to make a temporary stop—as, for instance, at a crossing—the operator moves the clutch-lever with his foot and maintains his foot thereon during the period of the stop; but when it is desired to make a permanent stop—such, for instance, as to allow the operator to leave the car—it is at present necessary to shift the gears to the neutral point.

The object of my invention is to provide mechanism whereby by the operation of the clutch-lever alone a temporary stop or a permanent stop may be obtained. To that end, speaking generally, I provide a pivoted pawl which coacts with a notched plate. This pawl is so combined with the clutch-lever that it moves therewith and is normally in line with the notched plate, but is provided with a tailpiece adjacent to the point where the foot is applied to the clutch-lever, so that it may be moved with the clutch without independent movement or can also be moved on its pivot out of line with the notched plate. When the clutch-lever is operated with the pawl in line with the plate, it will interlock with the plate-notch and hold the clutch out of engagement; but when the pawl is swung on its pivot out of line with the sector and the clutch-lever operated it will no longer coact with the notched plate, and the clutch will remain out of engagement only so long as the operator retains his foot upon the lever.

I will first describe the embodiment of my invention illustrated in the accompanying drawings and then specifically point out the invention in the claims.

Figure 1:
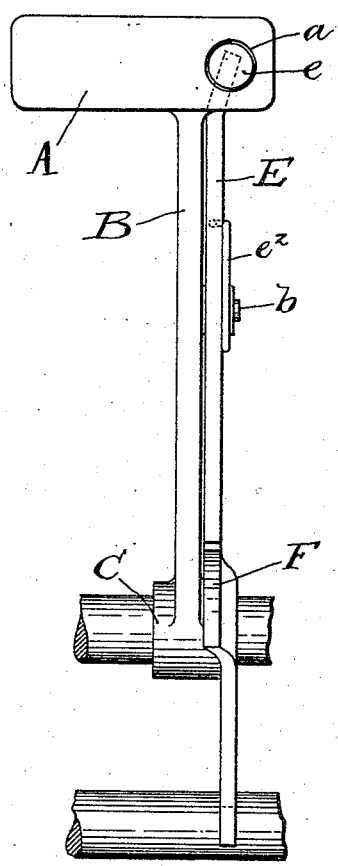
Figure 2:
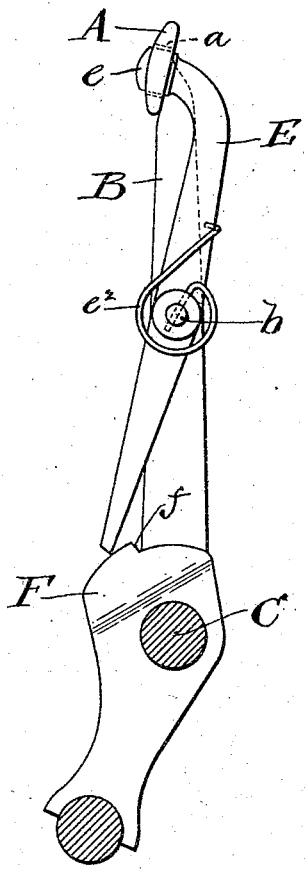

In the drawings, Figure 1 is a front view of a foot-pedal and locking-pawl. Fig. 2 is a side view of same.

A is the foot-pad of the clutch-lever B, pivoted at C and operating the clutch-fork. The foot-pad A has near one end an orifice $a$, through which a tailpiece $e$ of pawl E extends. The pawl E is pivoted at $b$ to the lever B and is acted on by the spring $e^2$. When the tailpiece $e$ extends through the orifice $a$ in the foot-pad A, the pawl E is in line with the notched surface $f$ of the plate F. When the operator places his foot on that portion of the foot-pad, the projection $e$ is forced inward, turning the pawl on its pivot, moving it out of alinement with the notched surface $f$.

In operation when it is desired to make a temporary stop the operator places his foot on the orificed portion of the foot-pad A, and the clutch remains out of action only so long as the operator holds it by his foot. When it is desired to make a permanent stop, the operator places his foot upon the non-orificed portion of the foot-pad and the pawl will engage the notched portion of the sector and hold the clutch out of engagement until the operator releases the pawl by moving the foot-pad at the orificed portion.

When in the specification and claims I use the term "notched plate" or "plate provided with notches," I do not intend to limit myself to that or any specific construction, as I intend to include any device which will coact with the pawl to hold the lever and clutch from movement.

Having now fully described my invention, what I claim, and desire to protect by Letters Patent, is—

1. The combination with a pivoted lever of an orificed foot-pad thereon, a stationary notched plate, a pawl pivoted on the lever, and a spring between the lever and pawl normally holding said pawl in line with said notch whereby when the lever is moved by the foot-pad the pawl will engage the notch and lock the lever, said pawl having a tailpiece normally projecting through said orifice and beyond the face of the foot-pad and adapted to be operated to move the pawl against the action of the spring out of line of the notch whereby when the foot-pad and tailpiece are operated in unison the pawl will be ineffective to lock the lever.

2. The combination with a lever pivoted at one end, an orificed foot-pad at the other end of the lever, a pawl pivoted between its ends to the lever, a locking-plate normally adapted to be engaged by one end of the pawl when the lever is moved by means of the foot-pad and a spring normally holding said pawl in its operative position, said pawl having on its other end a tailpiece extending through the orifice in the foot-pad, whereby the pawl may be moved against the action of the spring to bring its locking end out of line with the locking-plate.

In testimony of which invention I have hereunto set my hand, at Philadelphia, on this 4th day of November, 1904.

HENRY G. McCOMB.

Witnesses:
 HENRY GROSS,
 M. M. HAMILTON.